US006886578B1

(12) United States Patent
Knapp

(10) Patent No.: US 6,886,578 B1
(45) Date of Patent: *May 3, 2005

(54) VALVE CARTRIDGE WITH MULTIPLE PART ACTUATION MEANS

(76) Inventor: Francesco Knapp, Via Giacomo Leopardi 28, Cava Manara (Pavia) (IT)

(*) Notice: Subject to any disclaimer, the term of this patent is extended or adjusted under 35 U.S.C. 154(b) by 0 days.

This patent is subject to a terminal disclaimer.

(21) Appl. No.: 10/204,377

(22) PCT Filed: Nov. 28, 2000

(86) PCT No.: PCT/EP00/11868
§ 371 (c)(1),
(2), (4) Date: Nov. 27, 2002

(87) PCT Pub. No.: WO01/66985
PCT Pub. Date: Sep. 13, 2001

(30) Foreign Application Priority Data

Mar. 7, 2000 (IT) ..................................... TO2000A0210

(51) Int. Cl.⁷ ........................... F16K 11/06; F16K 31/60
(52) U.S. Cl. ............... 137/15.19; 137/271; 137/315.13; 137/315.15; 137/454.6; 137/625.4
(58) Field of Search ................... 137/315.13, 315.15, 137/454.6, 625.17, 625.4, 625.41, 15.19, 271, 1

(56) References Cited

U.S. PATENT DOCUMENTS

| 4,611,757 A | * | 9/1986 | Saether ..................... 236/12.12 |
| 4,715,406 A | | 12/1987 | Kress ....................... 137/625.4 |
| 5,681,028 A | * | 10/1997 | Cook et al. ................. 251/170 |
| 5,853,023 A | * | 12/1998 | Orlandi et al. .............. 137/271 |
| 5,887,608 A | * | 3/1999 | Bordelon et al. .............. 137/1 |
| 6,367,504 B1 | * | 4/2002 | Knapp .................... 137/625.11 |

FOREIGN PATENT DOCUMENTS

| EP | 0653581 | 5/1995 |
| EP | 0647807 | 1/1998 |
| WO | WO 99/18378 | 4/1999 |
| WO | WO 99/31417 | 6/1999 |

* cited by examiner

*Primary Examiner*—Stephen M. Hepperle
(74) *Attorney, Agent, or Firm*—Wood, Herron & Evans, LLP

(57) ABSTRACT

A device that can be applied to cartridges for water equipment, intended to receive a rotary operating member (9) for the purpose of promoting the structural unification of the largest possible number of parts making up the cartridges, where the rotary fitting (17) inside the cartridge is by itself not provided with a control pin and instead has a coupling means (16) and where the control pin of the cartridge is made separately from the internal rotary fitting and has an internal coupling means complementary to the coupling means presented by the internal rotary fitting and external coupling means (10) suitable for meeting the requirements of a handling member for which the cartridge is arranged. The internal rotary fitting of each type of cartridge can thus be unified, just as other parts of the cartridge, and can be provided with a unified coupling means, and with the cartridge, one can coordinate several control pins (18), all provided with one and the same unified internal coupling means complementary to the unified coupling means presented by the internal rotary fitting and presenting diverse external coupling means suitable to meet the requirements of different operating members.

14 Claims, 2 Drawing Sheets

VALVE CARTRIDGE WITH MULTIPLE PART ACTUATION MEANS

The object of this invention is a device that can be applied to cartridges for water equipment, intended to receive a rotary operating member for the purpose of promoting the structural unification of the largest possible number of parts making up the cartridges.

One problem faced by designers of cartridges for water equipment consists in the fact that the purchasers, generally faucet-producing companies, intend to apply to the control pins of cartridges some operating members of their own production or design such as handles, knobs, long or short levers and so forth and so on. For the purpose of being coupled to the control pins of the cartridges, these operating members are equipped with means that are not unified and therefore present a multiplicity of diverse diameters and profiles and must be coupled to the control pins of the cartridges at distances that are also different from the body of the cartridge. This forces cartridges designers to produce each type of cartridge intended to serve various purchasers through a multiplicity of models whose control pins are suitable for receiving different operating members. Therefore, the control pins of these cartridges must, in turn, be made with a multiplicity of shapes, while many other parts of the cartridges can be unified structurally. However, according to the state of the art, the control pin of a cartridge is made in one piece only and with an internal rotary fitting that has a more or less complex structure and, therefore, the entire assembly, made up of the control pin and the internal rotary fitting, must be made in different shapes, thus generating considerable work.

The main purpose of this invention is to provide sensible support for the economical production of cartridges for water equipment, thus making it possible to limit the above-mentioned major effort. Another purpose of the invention is to permit the insertion in a cartridge of a control pin that can perform other operations in addition to the operation of transmitting movement from one operating member to an internal mobile fitting without any need to modify other parts of the cartridge.

The main purpose of this invention is attained by virtue of the fact that the internal rotary fitting of the cartridge is in itself devoid of any control pin and instead has a coupling means and that the control pin of the cartridge is made separately from the internal rotary fitting and has an internal coupling means that complements the coupling means presented by the internal rotary fitting and an external coupling means suitable for meeting the requirements of an operating member for which the cartridge is prepared.

Preferably, said coupling means of the rotary fitting and of the control pin consists of portions that do not have an entirely circular section, especially dented or prismatic sections or circular sections interrupted by reliefs, hollows or facings when they are reciprocally involved in transmitting a rotary movement from the control pin to the internal rotary fitting.

In this way, the rotary fitting of a certain type of cartridge can also be unified as many other parts of the same cartridge and can present a unified coupling means, while the need for providing different control pins to meet the various requirements of the purchasers is met by making differentiated parts that comprise only control pins having all of the unified means for coupling to the rotary fitting and differing only in the characteristics of shape and external dimensions corresponding to those required by the operating members for which the cartridge is prepared. This results in a considerable reduction of major production costs caused by the impossibility of completely unifying the cartridges.

Advantageously, the control pin of the cartridge is so arranged as to be inserted in the rotary fitting during the assembly of the cartridge proceeding from the inside to the outside, and it is fixed in its axial position by means of a fixing member such as an elastic ring inserted in the outer part of the control pin after its coupling to the rotary fitting The invention can be used in all kinds of water equipment whose operating member is subjected only to rotary movements, and therefore, it can be used in simple faucets, in stopcocks, in thermostatic mixing devices, in progressive mixing faucets, in deviation devices, in water tapping controllers and so forth and so on.

These and other features, purposes and advantages of the object of this invention will appear more clearly from the following description of some embodiments consisting of nonrestrictive examples with reference to the attached drawings where:

Figure 1:
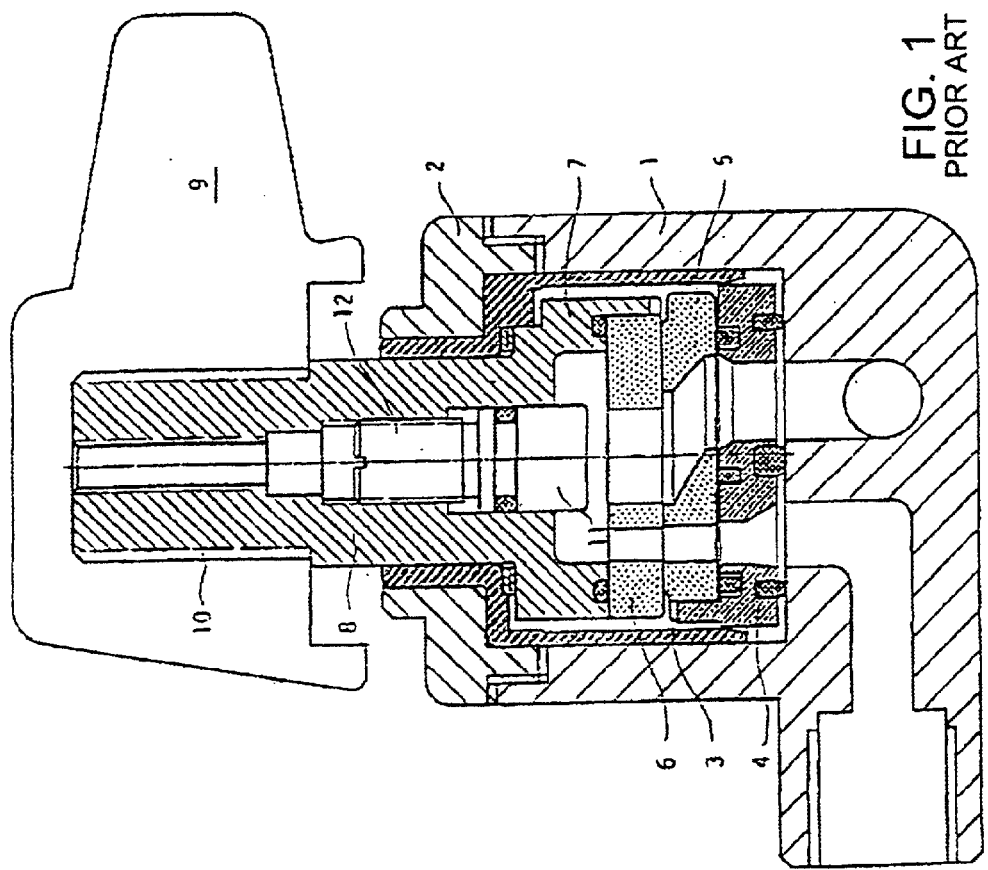
FIG. 1 is a profile view of an example of the water equipment where, according to the state of the art, the control pin of the cartridge is made in one piece with an internal rotary fitting.

The water equipment illustrated in FIG. 1 is a progressive mixing faucet based on a prior patent by the same inventor. It comprises a body 1 in which are made passages for the entry of hot and cold water (only one of which is visible in the drawing) and for drawing mixed water. Body 1 is provided with a lid 2 so placed as to hold in an internal cavity the body of a cartridge consisting of two complementary parts 3 and 4. Inside body 3–4 of the cartridge, there are a fixed blocking plate 5—in this case, integral with part 4 of the body of the cartridge—and a mobile blocking plate 6 integral with rotary fitting 7. The latter is extended in one piece in a control pin 8, which protrudes from body 3–4 of the cartridge and of lid 2 of the water equipment to receive a handling member, in this case, a lever 9, connected to control pin 8 with the help of coupling means 10.

Furthermore, in this case, control pin 8 contains, inside, a plunger 11 that by means of a threaded part 12 can be placed in an axially adjustable position in front of a central tapping passage of mobile blocking plate 6 for the purpose of regulating the maximum flow volume that can be drawn from the equipment.

Many parts of the structure of this cartridge and its operation do not involve the application of this invention and therefore are not described in detail.

Since different producers of similar water equipment can require that operating levers 9 or some other operating members be applied to them, where the features of coupling means 10 are different, cartridge 3–12 must be provided with different coupling means 10, in other words, with different control pins 8. This entails the production of different shapes of the entire complex made up of control pin 8 and internal rotary fitting 7, which, in turn, causes a considerable design and construction effort, as mentioned earlier.

Figure 2:
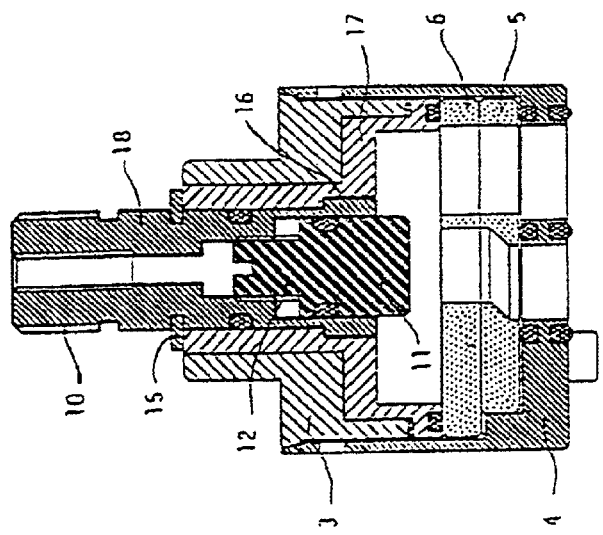
FIG. 2 is a profile view of a cartridge according to the invention that performs functions similar to those of the cartridge of the equipment according to FIG. 1.

The perfected cartridge according to the invention, shown in FIG. 2, has a body consisting of two complementary parts 3 and 4 where there are housed a fixed blocking plate 5 and a mobile blocking plate 6. The latter is integral with a rotary fitting 17. In contrast to the state of the art and in light of FIG. 1, this rotary fitting 17 is not by itself provided with a control pin and instead has a coupling means 16 that can consist of a dented or prismatic region or also a region having reliefs, hollows or facings that modify a circular section so as to render it suitable for transmitting a rotation. This coupling means can consist simply of a configuration of rotary fitting 17 or it can be made up of a metal insert applied to rotary fitting 17. It is particularly advantageous that the metal insert be co-stamped in making the rotary fitting 17 of plastic substance.

In turn, control pin 18 is made separately from mobile fitting 17 and can be introduced into it during the assembly of the cartridge, proceeding from the inside to the outside, and it has internal coupling means 16 that are complementary to those featured by mobile fitting 17 and external coupling means 10, intended to receive an operating member. In the figures, the coupling members of mobile fitting 17 and of pin 18 are shown coupled together and they are therefore not reciprocally distinguishable and are labeled by the same reference 16. The internal coupling means 16 of control pin 18 can also be made up of configurations of control pin 18 or—as the case may be and if control pin 18 is not itself metallic—can be made of a metallic insert.

Furthermore, control pin 18 can on its outer surface have a ring-shaped seat suitable for receiving an elastic ring 15 or some other suitable fixing member, which will axially fix its position with respect to mobile fitting 17, while the rotary solidarity between these two parts is ensured by coupling means 16 that are reciprocally involved. Therefore, once the cartridge is assembled, control pin 18 behaves in the same manner as if it were made integrally with rotary fitting 17. But as one can see, pin 18, and it alone, can be used in varied shapes and dimensions so that the external coupling means 10 turn out to be suitable for receiving a corresponding operating member with varying configuration, while rotary equipment 17 with its coupling means 16 becomes one of the parts of the cartridge that can be structurally unified.

Said elastic ring 15 can be absent in cases where coupling means 16 are so configured as to be by themselves capable of ensuring also axial solidarity between rotary fitting 17 and control pin 18. This can be achieved in a particularly effective fashion when a metallic insert, constituting coupling means, 16 is co-stamped in rotary fitting 17.

According to FIG. 2, control pin 18 inside contains a plunger 11 that by means of a threaded part 12 can be placed in an axially adjustable position in front of a water tapping passage in mobile blocking plate 6 so as to regulate the maximum flow rate value that can be drawn from the equipment. In this way, control pin 18 also has a function different from the function of transmitting movement. Therefore, the cartridge according to FIG. 2 performs the same functions as the cartridge included in the progressive faucet according to FIG. 1.

Figure 3:
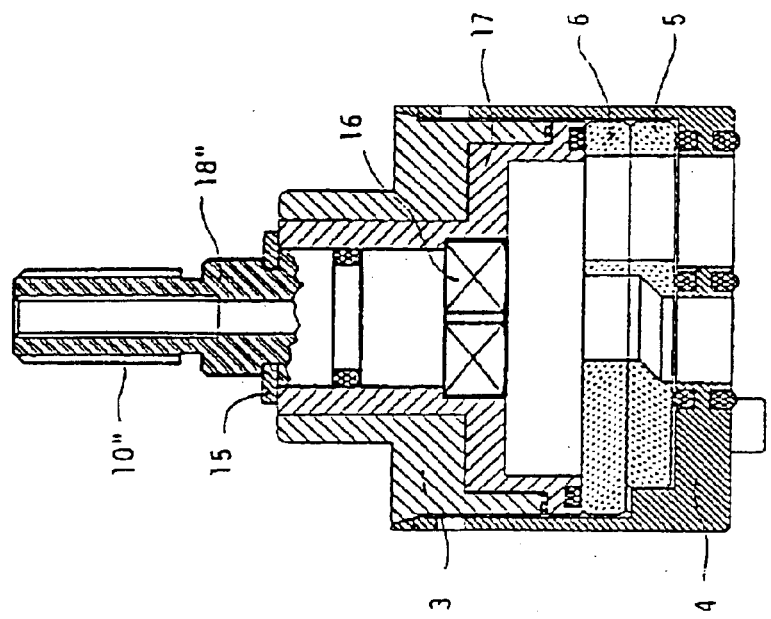
FIGS. 3 and 4 are profile views of a cartridge of the same type as in FIG. 2, but provided with control pins having different features.
Figure 4:
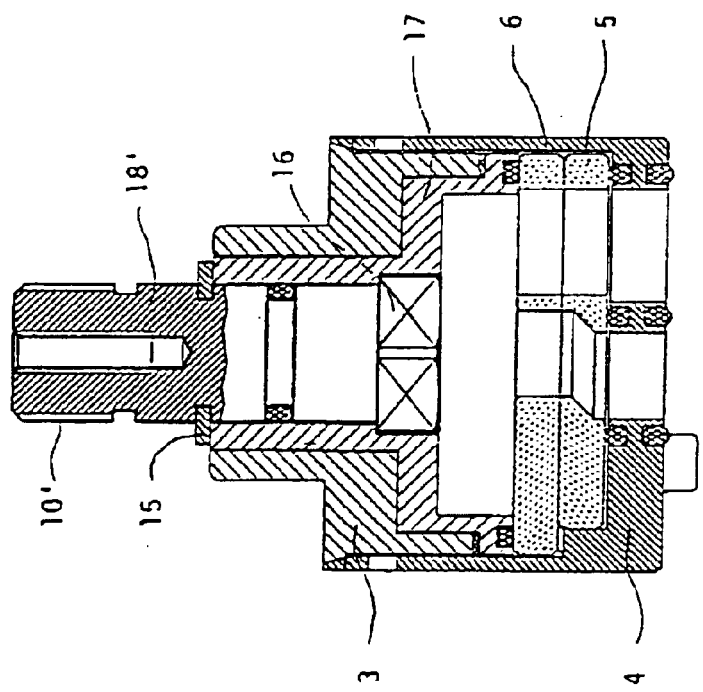

The function of limiting the maximum volume of water that can be drawn is not always required, and therefore, for the cartridge of the type shown in FIG. 2, one can arrange control pins 18' and 18", according to FIGS. 3 and 4, whose structure—in addition to meeting with regard to external coupling means 10' and 10" (as shown in FIGS. 3 and 4) meet diverse requirements generated by the operating members to which the cartridge is intended—features a simpler and therefore more economical makeup.

As we can see, the use of the invention makes it possible—while producing cartridges for water equipment of various kinds—to achieve unification that is greater than the unification that was possible according to prior technique, therefore, resulting in lower production costs; this unification can be preserved also for internal rotary equipment even in cases where the control pin has particular functions.

It must be understood that the invention is not confined to the embodiments described and illustrated as examples. Similar modifications are within the reach of the expert in the field, for example, as regards the structure and construction of internal coupling means 16 and the axial fixing of control pin 18, which may be obtained by means different from an elastic ring 15 and which may possibly be ensured by internal coupling means 16 themselves, as well as regarding possible additional functions assigned to the control pin. It must also be understood that the internal operating structures of the cartridge that are controlled by rotary fitting 17 can be of any kind, different from the kind shown by example, without any direct relation to the application of the invention.

These and other modifications and any substitution with technical equivalents can be made in the subject matter described and illustrated without departing from the scope of the invention and the coverage of this patent.

What is claimed is:

1. Device that can be applied to cartridges for water equipment intended to receive a rotary operating member so as to promote the structural unification of the largest possible number of parts making up the cartridges, characterized in that the internal rotary fitting of the cartridge is by itself devoid of any control pins and instead has a coupling means and that the control pin of the cartridge is made separately from the internal rotary fitting has an internal coupling means complementary to the coupling means presented to the internal rotary fitting and an external coupling means suitable to meeting the requirements of an operating member for which the cartridge is prepared, wherein the internal rotary fitting of each type of cartridge is provided with a coupling means and that, coordinated with the cartridge, are a plurality of control pins, all provided with one and the same unified internal coupling means complementary to the unified coupling means presented by the internal rotary fitting and featuring different external coupling means suitable to meet the requirements of different operating members.

2. Device that can be applied to cartridges for water equipment intended to receive a rotary operating member so as to promote the structural unification of the largest possible number of parts making up the cartridges, characterized in that the internal rotary fitting of the cartridge is by itself devoid of any control pins and instead has a coupling means and that the control pin of the cartridge is made separately from the internal rotary fitting and has an internal coupling means complementary to the coupling means presented by the internal rotary fitting and an external coupling means suitable to meet the requirements of an operating member for which the cartridge is prepared, the cartridge, there are arranged control pins capable of performing other functions in addition to the function of transmitting rotary motion from an operating member to the internal rotary fitting of the cartridge.

3. Device according to claim 2, above, characterized in that inside the control pin, there is a plunger that by means of a threaded part can be placed in an adjustable axial position in front of a simple passage of the mobile blocking plate of the cartridge to regulate the maximum water flow rate value that can be drawn from the equipment.

4. A kit for assembling a water equipment device, the kit comprising:
   a cartridge having
     (a) an internal rotary fitting;
     (b) a coupling means on the internal rotary fitting for interaction with each of a plurality of control pins, each of the control pins being non-integrally formed relative to the internal rotary fitting;
   each of the control pins having both an internal coupling means complementary to the coupling means on the internal rotary fitting of the cartridge and an external coupling means adapted to mate with a unique operating member for the water equipment device.

5. The kit of claim 4 wherein the internal rotary fitting coupling means further comprises a non-circular section adapted to mate with each of the control pins.

6. The kit of claim 4 wherein each control pin is adapted to be inserted in the rotary fitting during the assembly of the cartridge, proceeding from the inside to the outside of the cartridge.

7. The kit of claim 4 wherein each control pin further comprises:

an axial fitting adapted to mate with the internal rotary fitting coupling means.

8. The kit of claim 4 further comprising:

a metallic insert on at least one of the internal rotary fitting coupling means and the control pin internal coupling means.

9. The kit of claim 4 wherein each of the control pins is capable of performing an added function in addition to the function of transmitting rotary motion from the operating member to the internal rotary fitting of the cartridge.

10. The kit of claim 4 wherein each control pin further comprises:

a plunger having a threaded portion adapted to be adjustably and axially positioned relative to a passage in the cartridge to regulate water flow through the water equipment device.

11. A method of assembling a water equipment device comprising the steps of:

preselecting an operating member for assembly with a cartridge in the water equipment device;

selecting a control pin compatible with the operating member from a plurality of control pins each of which is compatible with the cartridge;

coupling the preselected operating member to the selected control pin; and coupling the selected control pin to the cartridge by inserting a portion of the selected control pin into an internal rotary fitting of the cartridge.

12. The method of claim 11 wherein the coupling of the selected control pin to the cartridge further comprises mating corresponding non-circular portions of the selected control pin and the internal rotary fitting to fix the selected control pin relative to the internal rotary fitting for rotational movement in the cartridge.

13. The method of claim 11 further comprising:

axially positioning a plunger having a threaded portion relative to a passage in the cartridge to regulate water flow through the water equipment device.

14. The method of claim 11 further comprising:

installing a metallic insert on at least one of the internal rotary fitting and the control pin.

* * * * *

UNITED STATES PATENT AND TRADEMARK OFFICE
CERTIFICATE OF CORRECTION

PATENT NO. : 6,886,578 B1
DATED : May 3, 2005
INVENTOR(S) : Francesco Knapp

It is certified that error appears in the above-identified patent and that said Letters Patent is hereby corrected as shown below:

<u>Column 4,</u>
Line 33, "presented to the internal" should read -- presented by the internal --.
Line 35, "to meeting the" should read -- to meet the --.
Line 47, "prepared, the cartridge," should read -- prepared, in the cartridge, --.

Signed and Sealed this

Second Day of August, 2005

JON W. DUDAS
*Director of the United States Patent and Trademark Office*